(12) United States Patent  (10) Patent No.: US 6,548,777 B2
Kato  (45) Date of Patent: Apr. 15, 2003

(54) SWITCH APPARATUS (75) Inventor: Hiroshi Kato, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/189,594

(22) Filed: Jul. 8, 2002

(65) Prior Publication Data
US 2003/0010616 A1 Jan. 16, 2003

(30) Foreign Application Priority Data
Jul. 12, 2001 (JP) ........................................ 2001-212119

(51) Int. Cl.[7] ................................................ H01H 3/04
(52) U.S. Cl. .................. 200/335; 200/61.27; 200/61.54
(58) Field of Search ................................ 200/335, 332, 200/61.54, 61.27, 18, 17 R, 4

(56) References Cited
U.S. PATENT DOCUMENTS
4,293,743 A * 10/1981 Iwata et al. ............... 200/61.27
5,652,417 A * 7/1997 Tsai et al. .................. 200/335

* cited by examiner

Primary Examiner—Elvin Enad
Assistant Examiner—M. Fishman
(74) Attorney, Agent, or Firm—Morgan, Lewis & Bockius LLP (57) ABSTRACT A switch case (11) is provided with an operating lever (12) to be turn-operated. The switch case 11 is further provided with moderating parts (13a, 13b). The operating lever is provided with a moderating piece (15), which is engaged with the moderating parts, and with a spring 16 for push-pressing this moderating piece against the moderating parts. In the switch case (11), turning engaging elements (18a, 18b) are formed in such a way as to be arranged in a turning direction of the operating lever. On the operating lever, turning engaged elements (19a, 19b), which are engaged with the turning engaging elements by a spring force of the spring in the home position thereof, are formed. When the operating lever is turned in the direction of an arrow (P), the turning engaged element is disengaged from the turning engaging element.

7 Claims, 7 Drawing Sheets

SWITCH APPARATUS

BACKGROUND OF THE INVENTION

The present invention relates to a switch apparatus performing a switching operation according to a turning operation of an operating lever.

Figure 7:
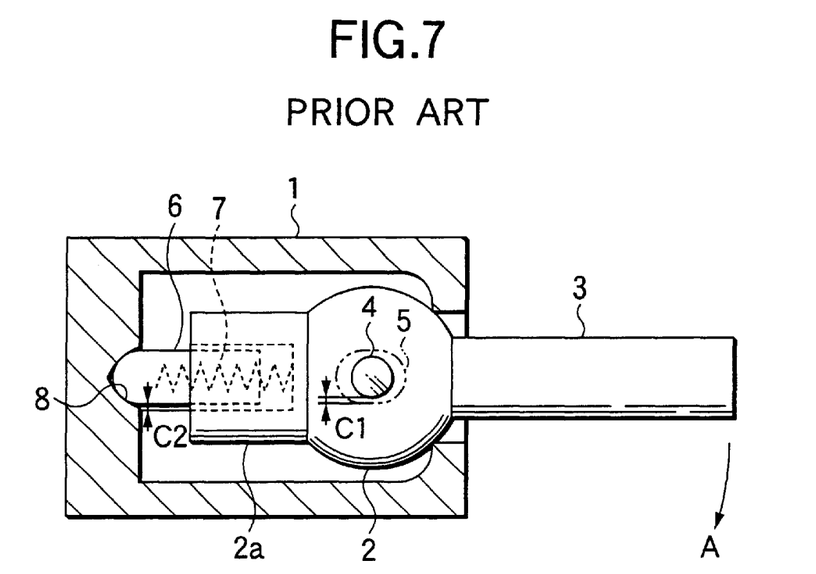
FIG. 7 is a longitudinal sectional side view illustrating an entire conventional switch apparatus.
Figure 8:
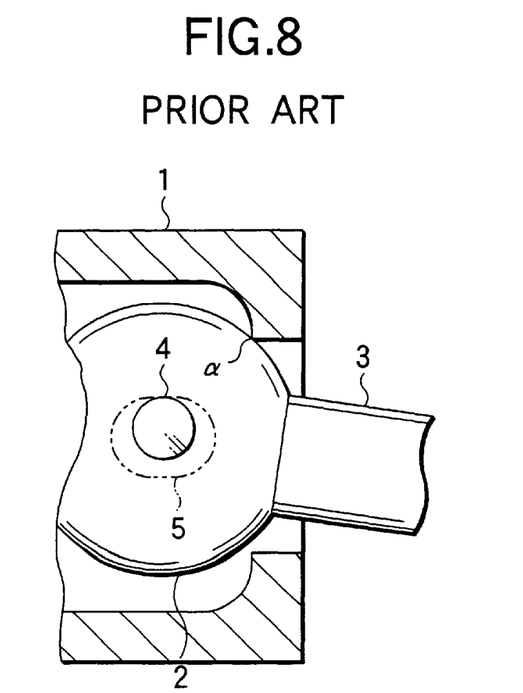
FIG. 8 is a view illustrating a manner in which the positional deviation of an operating lever occurs.

FIGS. 7 and 8 show the configuration of such a kind of a conventional switch apparatus. A spherical bracket 2 is accommodated in a switch case 1. A rod-like operating lever 3 and a cylindrical rib 4 are formed on this bracket 2. The rib 4 is inserted into an elongate hole 5 of the switch case 1. Incidentally, reference character C1 designates a clearance formed between the rib 4 and the elongate hole 5.

A piece accommodating part 2a is formed in the bracket 2. A moderating piece 6 is attached to the piece accommodating part 2a in such a way as to be able to laterally slide. This moderating piece 6 is pushed in a left direction by a spring force of a compression coiled spring 7. The moderating piece 6 is engaged in a moderating part 8 of the switch case 1 by a spring force of the spring 7. Thus, the operating lever 3 is held in a home position.

In the case of the switch apparatus of the conventional configuration, when the operating lever 3 is operated in the direction of an arrow A of FIG. 7, the moderating piece 6 is pushed by an inner surface of the moderating part 8. Thus, the moderating piece 6 is retreated in a right direction. Then, the moderating piece 6 exits from the inside of the moderating part 8, so that the operating lever 3 tilts in the direction of the arrow A. It is, however, difficult to form the bracket 2 and the switch case 1 so that the curvature of an outer circumferential surface of the bracket 2 is equal to that of an inner circumferential surface of the switch case 1. When the operating lever 3 is not operated, both the outer circumferential surface of the bracket 2 and the inner circumferential surface of the switch case 1 are in line or point contact with each other. Thus, as shown in FIG. 8, the rib 4 causes positional deviation in the elongate hole 5 at an initial stage of an operation of the operating lever 3. Moreover, the bracket 2 is turned around a point α. Thus, the positional deviation of the operating lever 3 is transmitted to a tip end part of the operating lever 3 by being amplified, so that an amount of backlash becomes large. Therefore, the conventional switch apparatus has room for improvement of the operational feeling of an operating lever.

SUMMARY OF THE INVENTION

The invention is accomplished in view of the aforementioned circumstances. Accordingly, an object of the invention is to provide a switch apparatus enabled to improve the operational feeling of an operating lever.

In order to solve the aforesaid object, the invention is characterized by having the following arrangement.

(1) A switch apparatus comprising:
   a switch case;
   an operating lever turnably provided in the switch case to be turn-operated in a first direction from a home position;
   moderating parts provided in the switch case;
   a moderating piece, for being engaged with the moderating parts, provided at an end part of the operating lever;
   a spring for pressing the moderation piece toward the moderating parts;
   two turning engaging elements provided in the switch case which are arranged side by side in the first direction; and
   two turning engaged elements which is adapted to be engaged with the two turning engaging elements, respectively, and provided in the operating lever,
   wherein when the operating lever is in the home position, the two turning engaged elements are engaged with the two turning engaging elements, respectively, and
   wherein when the operating lever is moved from the home position in the first direction, one of the turning engaged elements is engaged with corresponding one of the turning engaging elements and the other of the turning engaged elements is disengaged from the other of the turning engaging elements.

(2) The switch apparatus according to (1), wherein the turning engaging element is constituted by a groove part opened toward the moderating parts, and the turning engaged element is constituted by a projecting part.

(3) The switch apparatus according to (2), wherein the groove part is formed in V-shape.

(4) The switch apparatus according to (2), wherein the groove part is formed in semi-arc.

(5) The switch apparatus according to (1), wherein the operating lever is adapted to be turn-operated in a second direction substantially perpendicular to the first direction.

(6) The switch apparatus according to (1), wherein the moderating piece includes a spherical abutting portion which abuts to the moderating parts.

(7) The switch apparatus according to (6), wherein the moderating piece includes a contact operating element protruding from the abutting portion.

DETAILED DESCRIPTION OF PREFERRED EMBODIMENTS

Hereinafter, an embodiment of the invention is described with reference to FIGS. 1 to 6. In a switch case 11, an operating lever 12 is provided in such a manner as to be turned in the directions of arrows P and P' (see FIG. 1) and in the directions of arrows Q and Q' (see FIG. 2).

Figure 4:
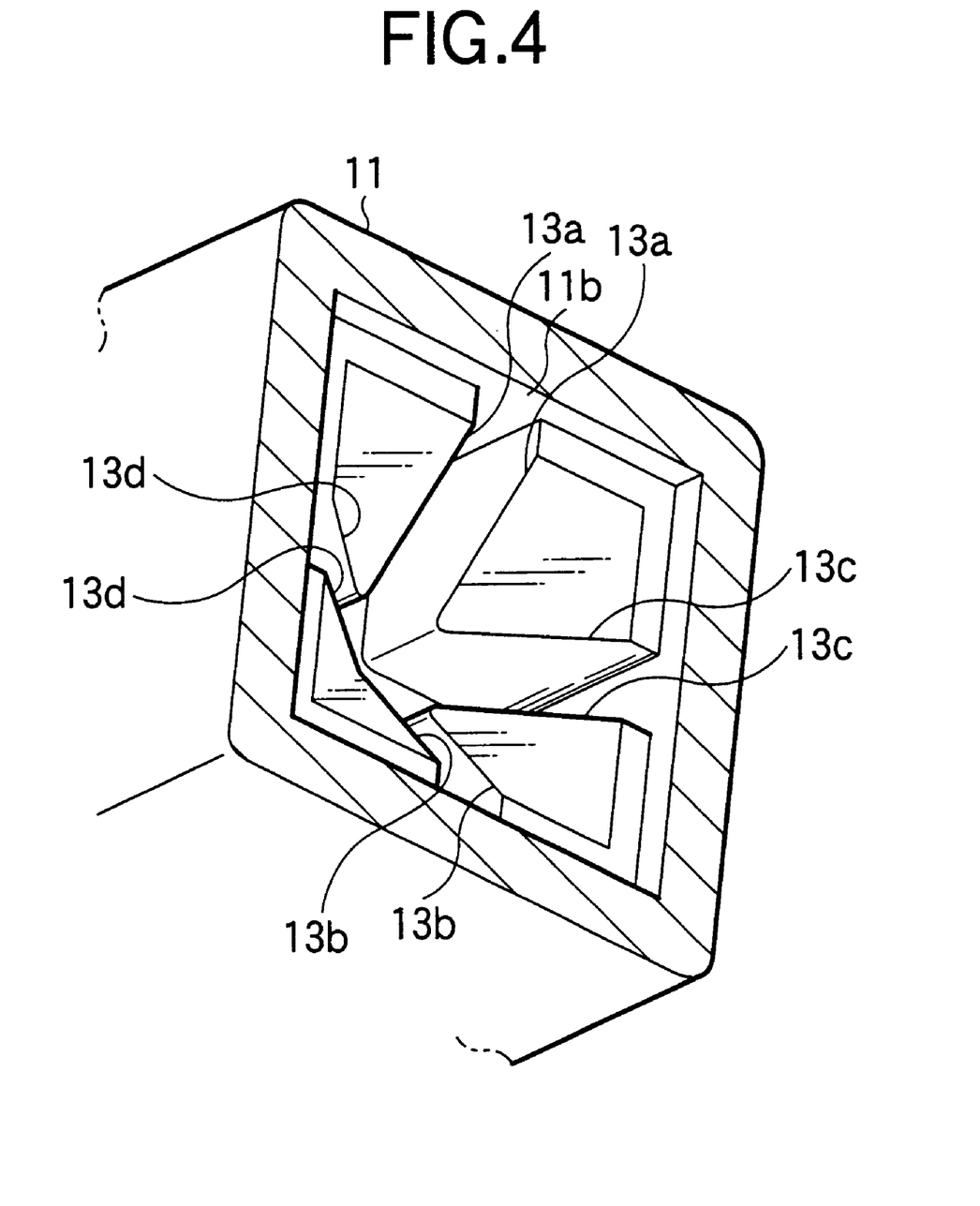
FIG. 4 is a broken perspective view illustrating moderating parts.

As shown in FIG. 4, in a left-part-sidewall of a moderating chamber 11a of the switch case 11, a cross operating element run through hole 11b is formed. Moderating parts 13a, 13a, 13b, 13b, 13c, 13c, 13d, 13d are formed on the edge part thereof. Each of the moderating parts 13a, 13a, 13b, 13b, 13c, 13c, 13d, 13d are inclined in such a way as to radiate from the central part of the operating element run through hole 11b to the periphery thereof. The moderating chamber 11a is opened at the right end thereof. An end part 12a (that is, the left end part) of the operating lever 12 is inserted through this opened part. In this end part, a piece placing deep-hole-like accommodating part 14 is formed. A moderating piece 15 is accommodated in this accommodating part 14 together with a compression coil type spring 16. In this case, a spherical abutting portion 15a provided at an end part of the moderating piece 15 projects from this cylindrical part 14. A contact operating element 15b is formed at an end portion of this abutting part 15a in such a way as to protrude therefrom. This contact operating element 15b is passed through the operating element run through hole 11b.

A frame-like engagement body 17, whose outer periphery coincides with the inner circumferential edge of an opened part of the moderating chamber 11a of the switch case 11, is attached to the switch case 11. Two turning engaging elements 18a and 18b, which are respectively opened toward the moderating parts 13a and 13b and nearly V-shaped, are formed in one 17a of side parts of this engagement body 17. These turning engaging elements 18a and 18b are formed in such a way as to be arranged side by side in each of the turning directions (that is, the directions of the arrows P and P') of the operating lever 12.

Figure 3:
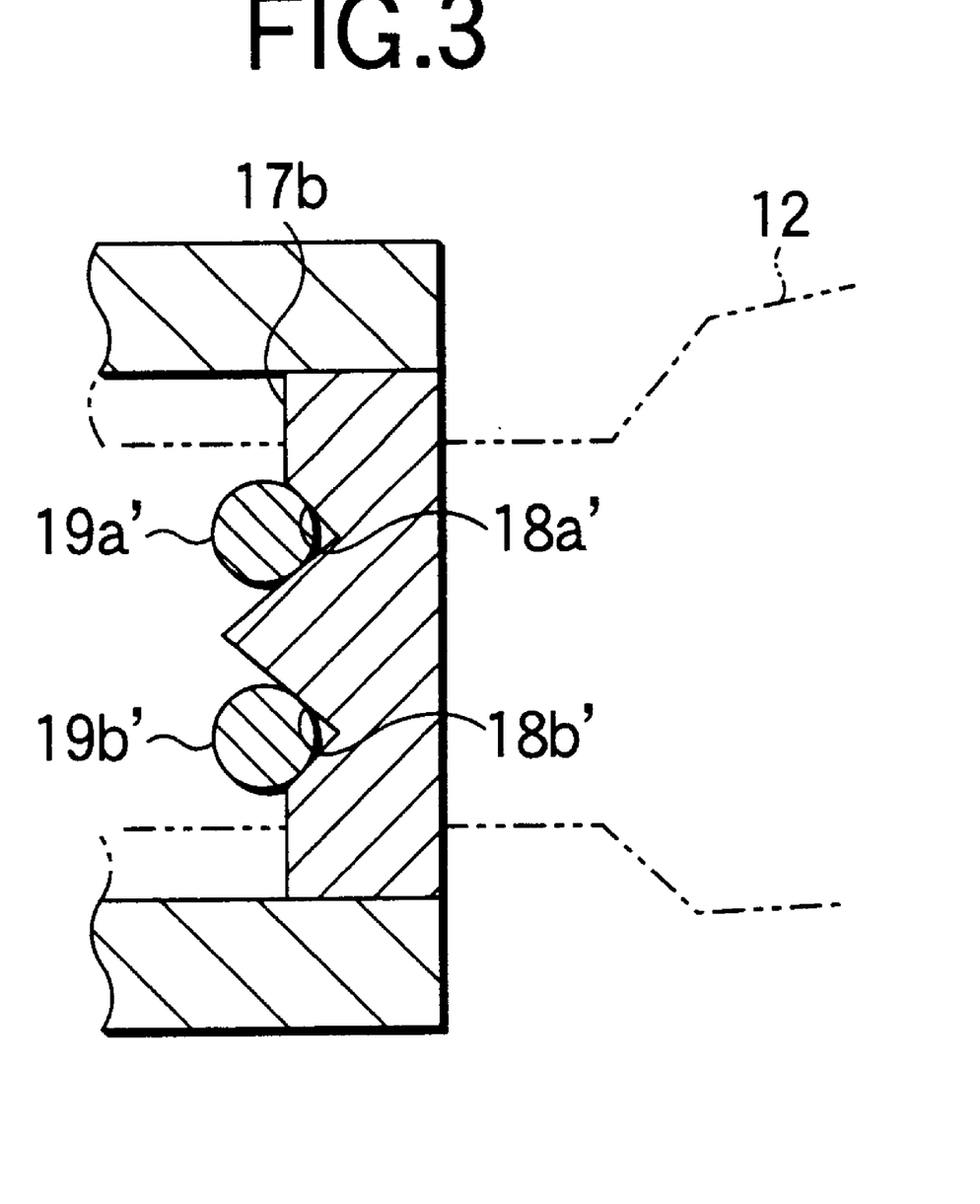
FIG. 3 is a sectional view taken in the direction of arrows on line W—W of FIG. 2.

As shown in FIG. 3, two turning engaging elements 18a' and 18b', which are respectively opened toward the moderating parts 13a and 13b and nearly V-shaped, are formed in a side 17b opposed to the side part 17a. These turning engaging elements 18a' and 18b' are formed in such a way as to be arranged side by side in each of the turning directions (that is, the directions of the arrows P and P') of the operating lever 12.

Cylindrical turning engaged elements 19a and 19b are provided at parts, which respectively correspond to the turning engaging elements 18a and 18b, on a surface 12c of an end part of the operating lever 12, which is provided at the side of the side part 17a of the engagement body 17, in such a manner as to project therefrom. Cylindrical engaged elements 19a' and 19b' are provided at parts, which correspond to the turning engaging elements 18a' and 18b', of a surface 12d of the end part 12a of this operating lever 12, which is at the side of the side part 17b of the engagement body 17, in such a way as to protrude therefrom.

Incidentally, the contact operating element 15b projects into the switch chamber 11c, in which a plate 20 and a moving contact plate 21 are mounted. The moving contact plate 21 is brought into slide contact with a stationary contact plate 23 mounted on an insulator 22.

Cylindrical sliding projections 24, 24 are respectively provided on surfaces 12d and 12e of the end part 12a of the operating lever 12, which are other than the surfaces 12b and 12c, in such a way as to project therefrom. A fitting hole 25 extending in the lateral directions is formed at a part corresponding to each of these sliding projections 24.

Figure 1:
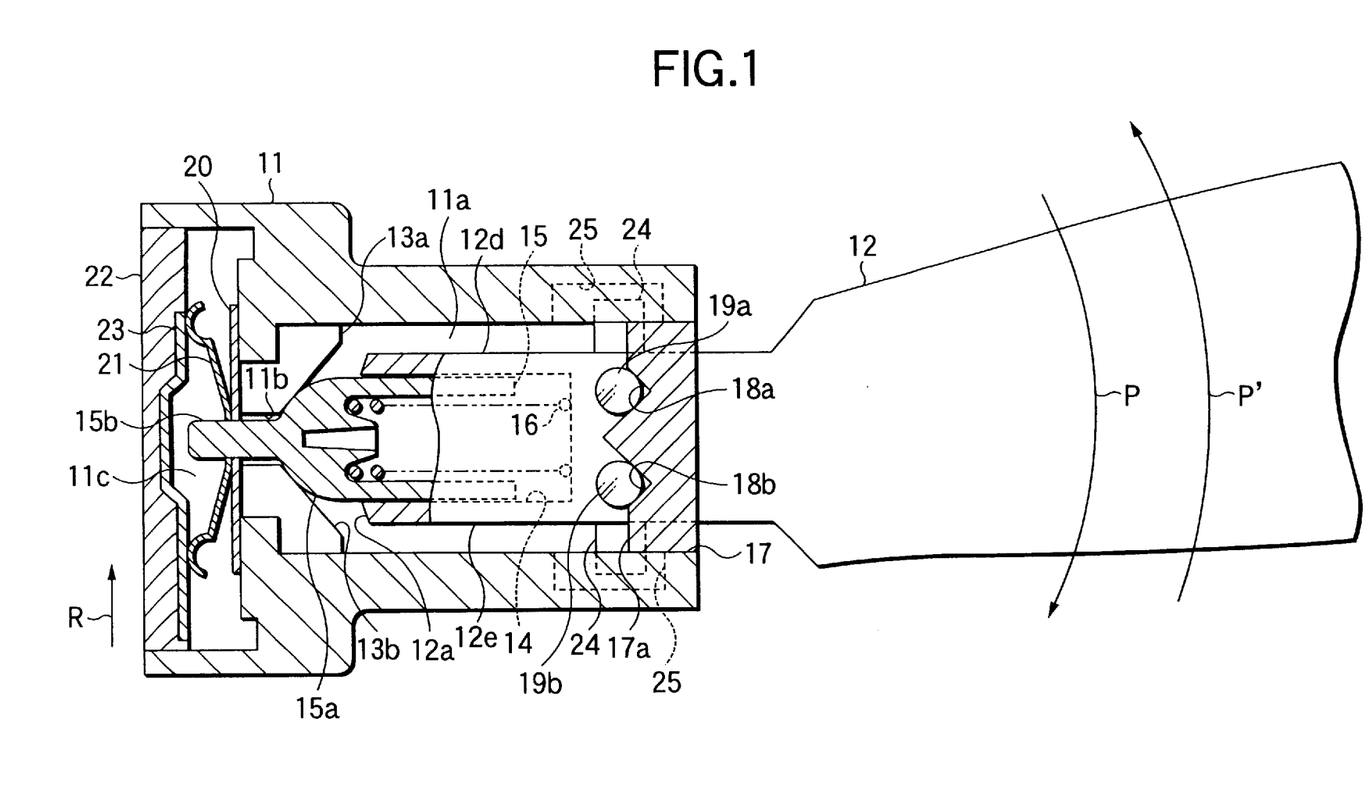
FIG. 1 is a longitudinal sectional side view illustrating an entire switch apparatus that is an embodiment of the invention.
Figure 2:
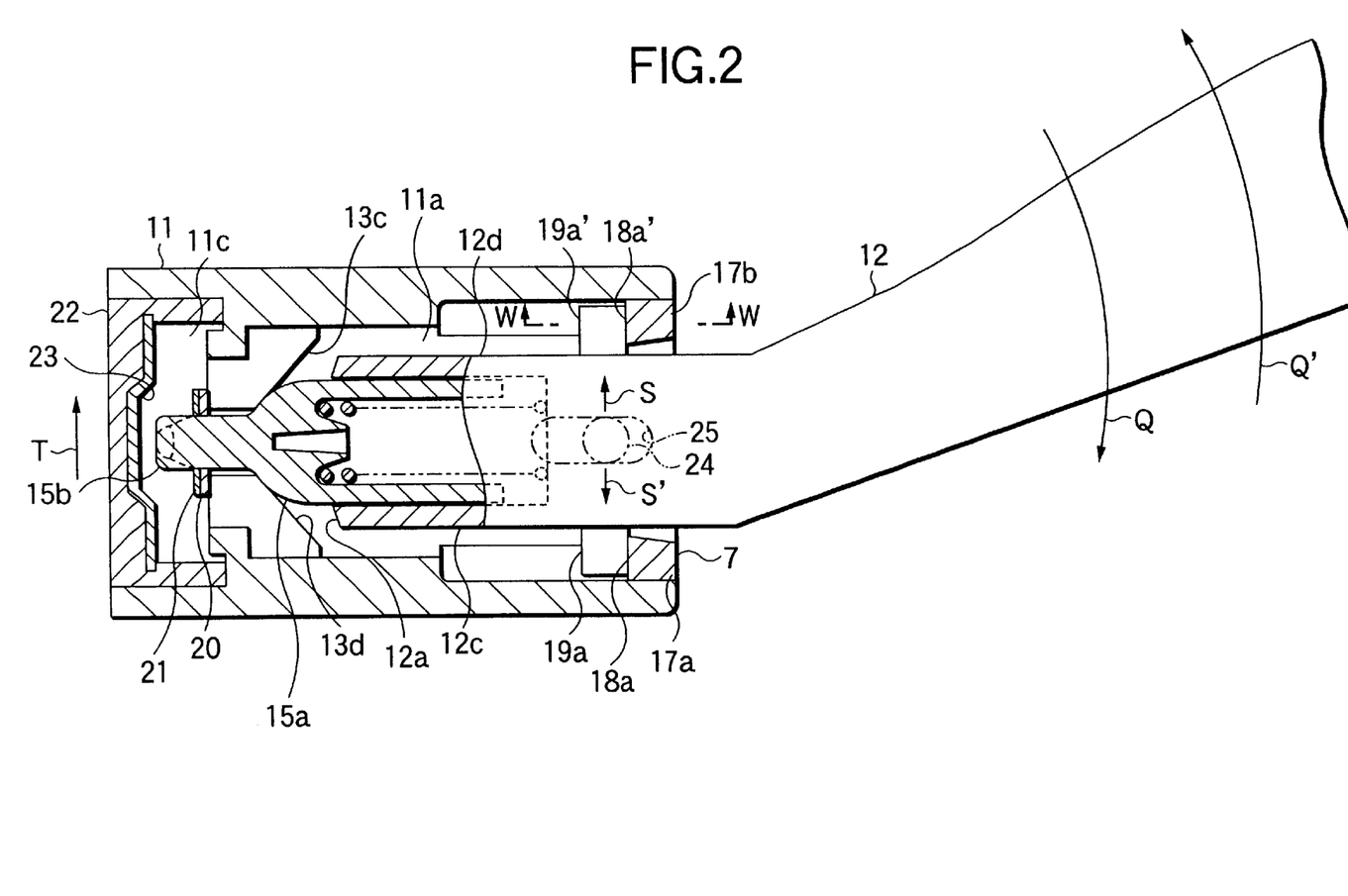
FIG. 2 is a lateral plan view illustrating the entire switch apparatus.

Incidentally, an operation of the apparatus of the aforementioned configuration is described hereinbelow. Referring now to FIG. 1, in the state shown in this figure, the abutting part 15a of the moderating piece 15 is pushed by the spring force of the spring 16 against the moderating parts 13a to 13d. Moreover, the turning engaged elements 19a, 19b, 19a', and 19b' are push-pressed against the turning engaging elements 18a, 18b, 18a', and 18b', respectively, and put in a fitted state. This position of the operating lever 12 shown in FIG. 1 is a home position thereof in the case that the operating lever 12 is turned in the directions of the arrows P and P'. Furthermore, the position of the operating lever 12 shown in FIG. 2 is a home position thereof in the case that the operating lever 12 is turned in the directions of the arrows Q and Q'.

Figure 5:
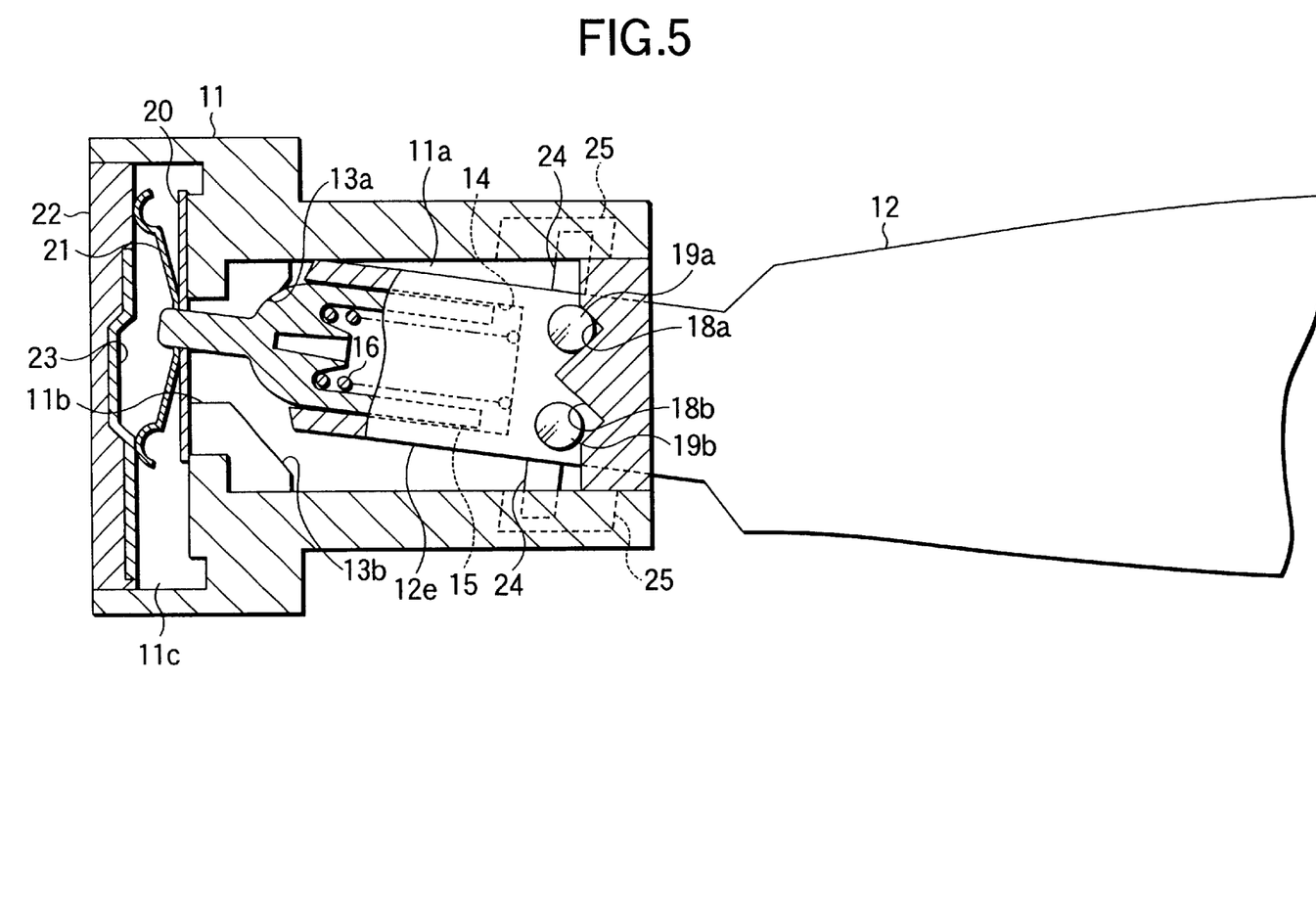
FIG. 5 is a view illustrating an operation of the embodiment and corresponding to FIG. 1.

When the operating lever 12 is turn-operated in the direction of the arrow P from the position thereof in the state shown in FIG. 1, inevitably, there is a single fulcrum for the turn. Thus, as illustrated in FIG. 5, during the engagement between the engaged element 19a (or 19a') and the engaging element 18a (or 18a') is maintained, the engagement between the engaged element 19b (or 19b') and the engaging element 18b (or 18b') is canceled against the spring force of the spring 16. Then, the moderating piece 15 runs onto the moderating parts 13a. In this case, the moderating piece 15 retreats against the spring force of the spring 16. As this operating lever 12 turns, the contact operating element 15b turns, so that the moving contact plate 21 is moved in the direction of an arrow R, and that the condition of the switch is changed. Incidentally, the sliding projection 24 moves through the fitting hole 25, and thus permits movement in the turning direction of the operating lever 12 and restrains the movement thereof in the direction of an arrow S of FIG. 2 and in the opposite direction, that is, the direction of an arrow S'.

In this case, the engagement between the engaged element 19a (or 19a') and the engaging element 18a (or 18a') is maintained. Thus, there is no backlash, so that the operating feeling is extremely good.

When the turning operation force of the operating lever 12 is canceled during the state illustrated in FIG. 5, the operating lever 2 returns to an original condition.

When the operating lever 12 is turn-operated in the direction of the arrow P' this time during the state illustrated in FIG. 1, the engagement between the engaged element 19b (or 19b') and the engaging element 18b (or 18b') is maintained, while the engagement between the engaged element 19a (or 19a') and the engaging element 18a (or 18a') is canceled against the spring force of the spring 16. Then, the moderating piece 15 runs onto the moderating part 13b. Similarly, in this case, the moderating piece 15 retreats against the spring force of the spring 16. As this operating lever 12 turns, the contact operating element 15b turns, so that the moving contact plate 21 is moved in a direction opposite to the direction of the arrow R, and that the condition of the switch is changed. Similarly, in this case, when the operating lever 12 is operated, no backlash is caused. Thus, the operational feeling is extremely good.

Figure 6:
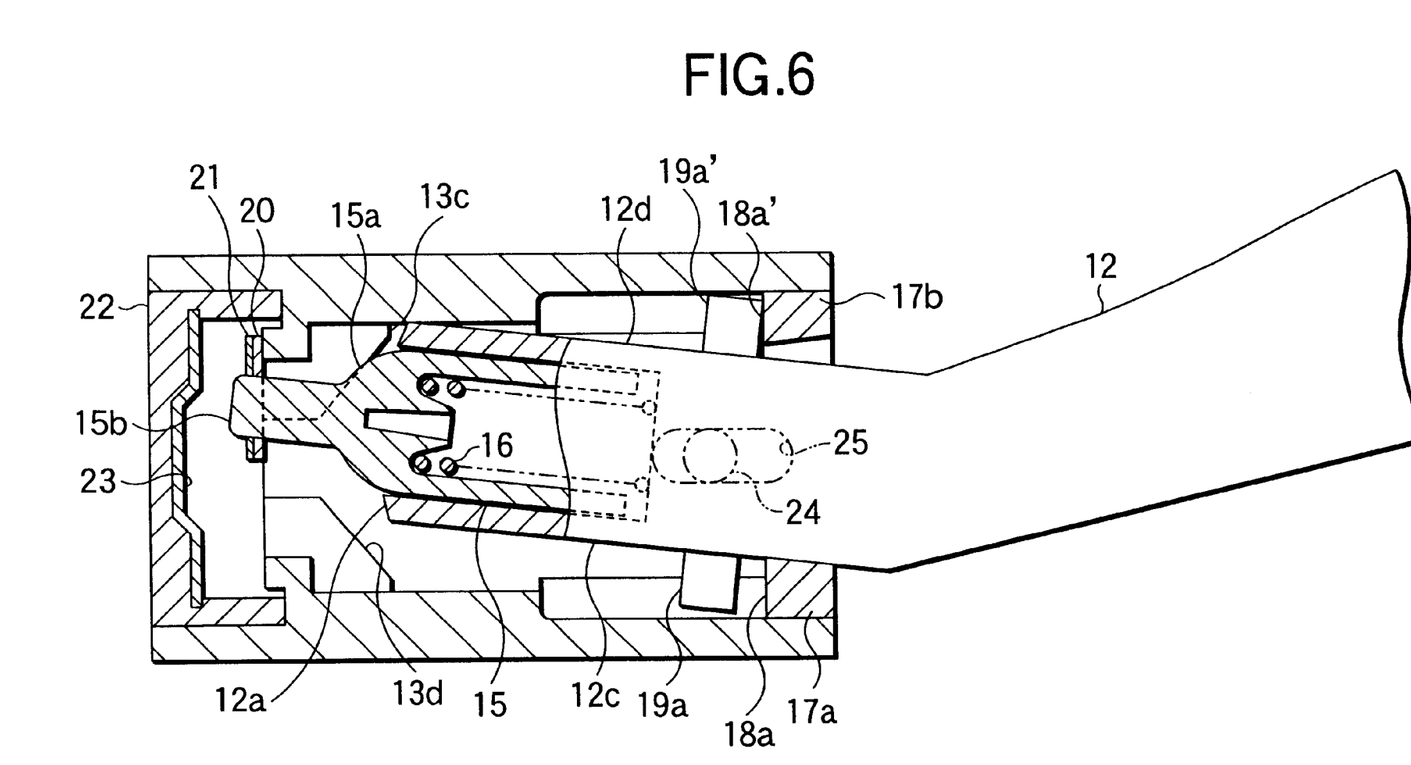
FIG. 6 is a view illustrating an operation of the embodiment and corresponding to FIG. 2.

When the operating lever 12 is turn-operated in the direction of the arrow Q from the position thereof in the state illustrated in FIG. 2, the engagement between the engaged element 19a (or 19b) and the engaging element 18a (or 18b) is canceled during the engagement between the engaged element 19a' (or 19b') and the engaging element 18a' (or 18b') is maintained as illustrated in FIG. 6. Then, the moderating piece 15 runs onto the moderating part 13c. Similarly, in this case, the moderating piece 15 retreats against the spring force of the spring 16. As this operating lever 12 turns, the contact operating element 15b turns, so that the moving contact plate 21 is moved in the direction of an arrow T, and that the condition of the switch is changed. Similarly, in this case, when the operating lever 12 is operated, no backlash is caused. Thus, the operational feeling is extremely good.

When the operating lever 12 is turn-operated in the direction of the arrow Q' this time, the engagement between the engaged element 19*a* (or 19*b*) and the engaging element 18*a* (or 18*b*) is maintained, while the engagement between the engaged element 19*a*' (or 19*b*') and the engaging element 18*a*' (or 18*b*') is canceled against the spring force of the spring 16. Then, the moderating piece 15 runs onto the moderating part 13*d*. Similarly, in this case, the moderating piece 15 retreats against the spring force of the spring 16. As this operating lever 12 turns, the contact operating element 15*b* turns, so that the moving contact plate 21 is moved in a direction opposite to the direction of the arrow T, and that the condition of the switch is changed. Similarly, in this case, when the operating lever 12 is operated, no backlash is caused. Thus, the operational feeling is extremely good.

Incidentally, the aforementioned embodiment may be configured so that a turning operation of the operating lever 12 is performed only in the directions of the arrows P and P'. Moreover, each of the grooves 18*a*, 18*b*, 18*a*', and 18*b*' may be formed like a semi arc. Furthermore, the (concave and convex) shapes of the turning engaging elements and the turning engaged elements are not limited to those of such elements of the aforementioned embodiment.

As is apparent from the foregoing description, according to the invention, the turning engaging elements are provided side by side in the turning direction of the operation lever. Thus, when the operating lever is turn-operated, one of the turning engaging elements remains engaged with a corresponding one of the turning engaged elements at all times. Consequently, the operating lever can be turn-operated without backlash to thereby improve the operational feeling thereof.

What is claimed is:

1. A switch apparatus comprising:

a switch case;

an operating lever turnably provided in the switch case to be turn-operated in a first direction from a home position;

moderating parts provided in the switch case;

a moderating piece, for being engaged with the moderating parts, provided at an end part of the operating lever;

a spring for pressing the moderation piece toward the moderating parts;

two turning engaging elements provided in the switch case which are arranged side by side in the first direction; and two turning engaged elements which is adapted to be engaged with the two turning engaging elements, respectively, and provided in the operating lever, wherein when the operating lever is in the home position, the two turning engaged elements are engaged with the two turning engaging elements, respectively, and wherein when the operating lever is moved from the home position in the first direction, one of the turning engaged elements is engaged with corresponding one of the turning engaging elements and the other of the turning engaged elements is disengaged from the other of the turning engaging elements.

2. The switch apparatus according to claim 1, wherein the turning engaging element is constituted by a groove part opened toward the moderating parts, and the turning engaged element is constituted by a projecting part.

3. The switch apparatus according to claim 2, wherein the groove part is formed in V-shape.

4. The switch apparatus according to claim 2, wherein the groove part is formed in semi-arc.

5. The switch apparatus according to claim 1, wherein the operating lever is adapted to be turn-operated in a second direction substantially perpendicular to the first direction.

6. The switch apparatus according to claim 1, wherein the moderating piece includes a spherical abutting portion which abuts to the moderating parts.

7. The switch apparatus according to claim 6, wherein the moderating piece includes a contact operating element protruding from the abutting portion.

* * * * *